United States Patent [19]

Drexhage

[11] 3,736,524
[45] May 29, 1973

[54] LASER MEDIA CONTAINING FLUORINATED ALCHOLS
[75] Inventor: Karl H. Drexhage, Rochester, N.Y.
[73] Assignee: Eastman Kodak Company, Rochester, N.Y.
[22] Filed: June 1, 1971
[21] Appl. No.: 149,055

[52] U.S. Cl. ................331/94.5, 330/4.3, 330/7.51, 252/301.2 R, 252/301.2 P
[51] Int. Cl. .............................................H01s 3/20
[58] Field of Search ................252/301.2 R, 301.2 P; 331/94.5; 307/88.3; 330/7.51, 4.3

[56] References Cited
UNITED STATES PATENTS 3,600,600    8/1971    Bey et al. .............................307/88.3
3,521,187    7/1970    Snavely et al. ........................331/94.5

Primary Examiner—Ronald L. Wibert
Assistant Examiner—R. J. Webster
Attorney—Robert W. Hampton, Paul R. Holmes and Tom Hiatt

[57] ABSTRACT

Certain fluorinated alcohols are useful as solvents for fluorescing dyes in the formation of lasing media.

9 Claims, No Drawings

LASER MEDIA CONTAINING FLUORINATED ALCHOLS

This invention relates to laser systems and more particularly to laser systems using as a lasing media, solutions of organic dyes in a liquid which has an effect on the efficiency of lasing.

Lasers (acronym for light amplification by stimulated emission of radiation) or optical masers (acronym for microwave amplification by stimulated emission of radiation) are light amplifying devices which produce high intensity coherent monochromatic light concentrated in a well collimated beam commonly called a laser beam. There are several uses for such laser beams. Since the beam can be sharply focused, it can produce energy densities suitable for drilling, welding, cutting, etc. One potential application of laser beams is in the field of communications where the optical spectrum represents almost limitless bandwidth and information carrying capacity.

It is desirable to have lasers which are operable at many different wavelengths in the light spectrum including infrared, visible and ultraviolet regions. Since the wavelength emitted by a specific energy transition in a laser medium is tunable over only a small portion of the spectrum, it is necessary to provide a number of materials adapted for use as active laser media at various light frequencies. Many of the materials discovered thus far which are capable of acting as laser media have been in the solid and gaseous states. It is also known that certain organic dyes in solution can operate as "liquid" or "organic dye" lasers. Of the range of materials useful as lasing media, organic lasing dyes provide certain advantages. A wide range of organic dye lasers is available to provide stimulated emission (lasing) over a broad range of the spectrum. Secondly, organic dye lasers are generally capable of being tuned to emit over range of wavelengths, this being in contradistinction to the essentially single wavelength capability of lasing emission characterizing gas and solid lasers. Thirdly, organic dye lasers provide an economical lasing medium when compared to gas and solid lasers, and they do not suffer from disadvantages such as cracking and optical inperfections that are particularly associated with solid lasers.

The ability to selectively tune organic dye lasers derives from the broad band fluorescence characteristic of the component dye. Such lazers can be "tuned" to emit at wavelengths along substantially the entire fluorescence band of the dye by interposing a dispersive element, such as a diffraction grating or a prism.

The operation of a laser is achieved as a result of the phenomenon that excited atoms or molecules can emit a photon or quantum of light, which photon or quantum can itself trigger another excited atom or molecule to emit its photon prematurely. This process is designated stimulated emission.

The excitation of organic lasing dyes can be achieved by subjecting the dye, under controlled conditions such as will be described herein, to a suitable source of energy such as bombarding it with electrons or illuminating it with a high energy source. Conventionally, illumination is utilized for liquid laser materials. Excitation of a liquid laser medium by illumination is generally termed "optical pumping" or merely "pumping". Pumping sources include, for example, sources such as giant pulse lasers, xenon and argon arc flash tubes as well as arc discharge tubes containing only air or other gaseous mixtures.

Various arrangements of laser apparatus can be used. A laser structure particularly adapted for organic dye liquid laser media is described by Sorokin et al., *IBM Journal*, v. 11, p. 148 (1967). Advantageous laser apparatus structures usually include an optically resonant cavity containing a reservoir of a liquid laser medium or a liquid laser body disposed within a thin-walled quartz cylinder. Typically, the reservoir is part of a closed system through which the dye solution is circulated during lasting operation. Thus, localized heating which can cause refractive discontinuities and potential breakdown of the dye is effectively prevented. To provide an energy source for exciting the atoms of the laser material, the laser body can be surrounded concentrically by a lamp, such as one containing an annular region within an outer thick-walled quartz cylinder. The annular region can contain an air-argon mixture and have electrodes which are operably connected to a low inductance capacitor charged by a standard high voltage supply. Desirably coaxially disposed at either end of the optically resonant cavity are opposed internally reflective cavity ends such as mirrors.

When optical pumping is used, the light source emits light having wavelengths within at least one absorption band of the lasing medium. The absorbed light causes molecular electrons in the medium to shift in energy level. Molecular electrons exist either in a singlet state (two electrons spinning in opposite directions) or a triplet state (two electrons spinning in the same direction). The ground state is the unexcited state for molecular electrons and has the lowest energy. Typically, the ground state in almost all molecules is a singlet (designated $S^0$), one of many possible energy levels in the singlet state. When the pumping source is activated, the resultant light pulse enters the laser body and photons of energy of appropriate absorptive wavelength are absorbed by active molecules in the body and cause the electrons of such molecules to shift from an initial low energy level ($S^0$) to a high energy level from which emissive transition occurs.

In operation, the molecular electrons of the laser medium are desirably pumped to higher excited states of the singlet system by intense energy inputs. It is thought that they then first undergo transitions from such excited states to the lowest excited state (designated $S^1$). After diminishing in energy level to the lowest excited singlet, the molecule can relinquish its remaining excess energy radiatively or non-radiatively from $S^1$ to $S^0$, non-radiatively from $S^1$ to a triplet state and then radiatively or non-radiatively from the lowest excited triplet state to $S^0$. Generally, laser emission consists of optical emission resulting from transitions from $S^1$ to various vibrational modes of $S^0$. Susceptibility to triplet formation upon pumping is deleterious due to typical non-radiative energy losses resulting from triplet to $S^0$ transitions. Also, if there is significant overlap between the triplet absorption and either the pump bands or lasing emission bands, laser action generally will be impeded or will fail entirely. Additionally, advantageous laser emission can occur only when the population of molecules established at this higher energy level in the laser body by such light pumping exceeds the population of molecules remaining at the initial low energy level, a condition conventionally designated "population inversion" or "inversion of energy states".

Upon reaching an inversion of energy states, individual molecules of the high energy level population undergo emissive transition spontaneously, shifting to a terminal low energy level as described herein with a concomitant emission of light. A portion of the spontaneously emitted light is usually reflected back and forth through a resonant optical cavity structure, such as previously described, between its internally reflective ends. As this light passes through the laser body in multiple bidirectional reflections, it induces other molecules of the enlarged high energy level population to undergo premature light emissive transitions as noted herein. This produces more light, which augments the bidirectionally reflected light in the cavity to induce still further light emissive transitions. A rising pulse of bidirectionally reflected light quickly develops in the cavity, reaching a quantitatively large value as the induced emissive transition of molecules from the high energy level population increases. If one of the reflective cavity ends if partially transmissive, as is typically the case, a portion of the intense reflected light pulse passes through the one end and out of the cavity to constitute the laser output light pulse or the laser beam.

For many dye laser applications, it is desirable to produce continuous laser beams or beams having a high frequency of output pulses. However, the high power input required for such purposes tends to produce undesirable effects in most organic solutions of organic dyes previously used as lasing media. For example, high power inputs tend to produce temperature gradients in prior organic solvents which can cause optical inhomogenities. This phenomenon substantially decreases lasing efficiency.

A potential solution to the problems produced by high frequency excitations is the use of water as a dye solvent. Although water has excellent thermal properties, the use of water has been frustrated by the fact that many organic dyes which lase in organic mediums such as methanol are not soluble in water.

Another problem often encountered with various dye lasing media is that the dye becomes aggregated which results in decreased lasing efficiency.

It is, therefore, an object of this invention to provide a suitable solvent which reduces dye aggregation in solutions used as lasing media.

Another object of this invention is to provide a solvent for forming dye solutions useful as lasing media which solvent is compatible with other liquids present in the media.

A further object of this invention is to provide a solvent system for luminescing dyes that improves the luminescence efficiency of the dyes and thus also the efficiency of a dye laser utilizing the dye in such a solvent system.

These and other objects and advantages are obtained through the use of fluorinated alcohols as a solvent or additive to fluorescing dye solutions. The addition of these alcohols separately or in combination reduces the dye aggregation and increases the quantum yield of fluorescence. Additionally, the fluoro-alcohols of this invention are compatible with water and thus can be used with water present in the lasing media. Typically, the presence of water is preferred because of its excellent thermal properties; however, useful results can be obtained with the fluoro-alcohols in the absence of water.

According to this invention, useful solvents include a variety of fluorinated organic alcohols such as fluorinated aliphatic and/or aromatic alcohols, including monohydric, dihydric or polyhydric alcohols. Useful fluorinated aliphatic alcohols would include lower alcohols such as those having from one to six carbon atoms and preferably from about two to about four carbon atoms. Useful fluorinated aromatic alcohols are fluorinated aryl alcohols, including substituted fluorinated aryl alcohols, such as various benzene derivatives wherein the hydroxy radical is directly attached to the aryl nucleus or is attached to the aryl nucleus through an alkylene moiety having from one to about four carbon atoms. Preferred alcohols are those which are liquid at room temperature so that special handling techniques are not required. Representative alcohols useful in the present invention would include the following materials.

Table 1

| No. | Name |
| --- | --- |
| 1 | trifluoroethanol |
| 2 | trifluoroethanediol |
| 3 | tetrafluoropropanol |
| 4 | hexafluoroisopropanol |
| 5 | hexafluoroisopropanediol |
| 6 | hexafluorobutanol |
| 7 | hexafluoroisobutanol |
| 8 | hexafluoropentanol |
| 9 | trifluorophenol |
| 10 | trifluoromethylphenol |
| 11 | trifluororesorcinol |
| 12 | trifluorophenylcarbinol |
| 13 | trifluoromethylphenylcarbinol |

The dyes which are useful in the present invention include most organic dyes capable of lasing. Included among the many useful dyes are xanthene dyes, coumarin dyes, cyanine dyes including carbocyanine and merocyanine dyes, and pyrylium dyes including benzopyrylium dyes and the sulfur analogs of such pyrylium dyes. Various rigidized forms of dyes mentioned above are also useful. The term "rigidized" or "rigidized dye", as used herein, has reference to a dye having a structure which restricts the number of stereoisomers in which the dye can exist. Particularly, the conjugated chain which typically defines a chromophore is integral to a fused ring system that resists the occurrence of numerous rotational modes of vibration in the dye chromophore. As such a fused ring system is free from chemical bonds that would permit one portion of the chromophore to rotate with respect to another portion of the chromophore, the dye is designated a rigidized dye. Exemplary useful rigidized lasing dyes are described in copending application of Lincoln and Heseltine, Ser. No. 126,988, filed Mar. 22, 1971, now abandoned, and entitled DYE LASERS INCLUDING RIGIDIZED CARBOCYANINE DYES.

The dye concentration in the lasing media of this invention can vary from about $10^{-7}$ to about $10^{-1}$ moles per liter and preferably is within the range of about $10^{-4}$ to about $10^{-3}$ moles per liter. The concentration will vary, of course, depending upon the dyes used and the results desired. The amount of fluorinated alcohol in the solvent system can vary from about 10 percent to 100 percent by volume; however, from a practical standpoint, little or no charge is seen if greater than about 85 percent alcohol is used with the remainder comprising water. Preferred solvent systems comprise from about 10 to about 30 percent of fluorinated alcohol and about 90 to about 70 percent water. If the amount of alcohol in the system is reduced substantially below about 10 percent, the useful dyes tend to precipitate.

As mentioned above, the fluorinated alcohols of this invention increase the fluorescence quantum yield of various lasing dyes. Of the dyes useful in this invention, many have a fluorescence quantum yield in common solvents, such as methanol, ethanol, dimethylketone, etc., of only 30 percent. It is believed that this low yield is due to rotation of, for example, the amino groups on the dye. Such rotation enhances the rate of internal conversion to the ground state, which is a non-radiative process, and thus reduces the quantum yield. However, the strong interaction of the present fluorinated alcohols with dye molecules apparently inhibits these rotations and thereby increases the fluorescence quantum yield of the dye. The strong interaction of the present alcohols with the dye molecules also gives rise to a shift of absorption and fluorescence maximum of, for example, the xanthene dyes to shorter wavelengths.

The present lasing media can be used in a variety of laser apparatus. A laser structure particularly adapted for testing organic dye liquid laser media is that described by Sorokin et al., *IBM Journal* (supra). For continuous operation, the present lasing media can be used in apparatus of the type described in copending application of S. A. Tuccio and O. G. Peterson, Ser. No. 51,790, filed July 2, 1970, and entitled CW ORGANIC DYE LASER.

The following examples are included for a further understanding of the invention.

Example 1

A quantity of the lasing dye Rhodamine 3B is dissolved in three common solvents previously known in the laser art and in four fluorinated alcohols of this invention. The resulting seven solutions which contain the dye in a $10^{-4}$m concentration are then tested in apparatus of the type described by Costa et al. in "Absolute Luminescence Spectra via Digital-Technique and Time-Resolved Spectroscopy", *Applied Optics*, Vol. 8, No. 6, June, 1969, to determine the wavelength of the radiation absorption maximum, the wavelength of the fluorescence maximum and the fluorescence quantum yield. The results of these determinations are shown in Table 2 below together with an indication of the solvents used.

TABLE 2

| No. | Solvent | $\lambda abs^{(nm)}$ | $\lambda fl.^{(nm)}$ | Quant. yield (%) |
|---|---|---|---|---|
| C-1 | $C_2H_5OH$ | 555 | 578 | 33 |
| C-2 | $CH_3COCH_3$ | 556 | 582 | 22 |
| C-3 | $CH_3CN$ | 556 | 582 | 20 |
| 1 | $CF_3CH_2OH$ | 550 | 572 | 53 |
| 3 | $CHF_2CF_2CH_2OH$ | 552 | 574 | 55 |
| 4 | $CF_3CHOHCF_3$ | 550 | 572 | 66 |
| 5 | $CF_3C(OH)_2CF_3$ | 552 | 572 | 63 |

Similar results are obtained using the following dyes: Rhodamine B, pyronin B and pyronin G.

Example 2

The procedure of Example 1 was repeated using Rhoda-mine 6G as the dye. This dye has a high fluorescence quantum yield in the usual solvents and thus, the influence of the solvent on the quantum yield is less pronounced. However, the wavelength shift observed in the fluorinated alcohols is greater with this dye. The results of the determinations of absorption and fluorescence maxima as in Example 1 are shown in Table 3 below.

TABLE 3

| No. | Solvent | $\lambda abs^{(nm)}$ | $\lambda fl.^{(nm)}$ | Quant. yield (%) |
|---|---|---|---|---|
| C-1 | $C_2H_5OH$ | 530 | 555 | 75 |
| C-2 | $CH_3COCH_3$ | 525 | 554 | 73 |
| C-3 | $CH_3CN$ | 523 | 553 | 78 |
| 2 | $CF_3CH_2OH$ | 516 | 540 | 74 |
| 5 | $CHF_2CF_2CH_2OH$ | 516 | 541 | 71 |
| 6 | $CF_3CHOHCF_3$ | 514 | 535 | 78 |
| 7 | $CF_3C(OH)_2CF_3$ | 515 | 535 | 74 |

Example 3

Rhodamine 6G is dissolved at a $2 \times 10^{-4}$m concentration in a solvent system comprising 25 percent by volume of hexafluoroisopropanol and 75 percent of water. The resulting lasing medium is placed in the cavity of a continuous wave (CW) laser as described in the above-mentioned copending application Ser. No. 51,790. This laser apparatus comprises a focused resonant cavity having a relatively small active volume. The cavity is adapted to permit longitudinal excitation of the lasing medium contained therein. Excitation radiation is introduced from a continuous energy source, such as an argon-ion CW laser, into the dye solution through one of the reflective mirrors comprising the cavity and is focused within the cavity at a power density sufficient to produce the necessary excited molecules. To dissipate thermal energy generated during pumping, and thereby maintain substantially constant the optical homogenity of the dye solution, the transparent dye cell windows through which pumping energy is introduced, comprise a material of relatively high thermal conductivity, such as sapphire or beryllium oxide. Continuous emission is accomplished by flowing the lasing medium through the focused optical cavity while simultaneously producing a population inversion in that portion of the lasing medium flowing in close proximity to the focal point of the cavity. Using the above solution, the dye lases at a wavelength of 570 nm. Using a $25 \times 10^{-4}$m solution of Rhodamine B in the same solvent system, the wavelength of lasing is 610 nm.

The following results using the fluorinated solvents of the invention show threshold excitation energies and lasing wavelengths for representative dyes, i.e., xanthene, pyrylium and coumarin, relative to results for the same dyes at the same concentrations dissolved in methanol and tested in the same laser. Air-saturated methanol is used as a standard "comparison" solvent because it is one of the most commonly used solvents and because it is a highly efficient solvent for short pulse ($<10\mu$sec) laser operation. For long pulse or CW operation, a solvent with the thermal properties (low coefficient of expansion plus large specific heat) of water is desired. The thermal properties of the solvent systems of this invention (e.g., 75 percent water, 25 percent fluorinated alcohol) are close to those of pure water, and thus, these mixtures are particularly suitable for use in a CW dye laser. In contrast to a pure water solvent (where dimerization of the dye molecules typically quenches fluorescence and insolubility is a problem), the fluorinated alcohol-water mixture provides thresholds comparable with methanol dye solutions while preserving the desirable thermal properties of a water solution.

Example 3

The following solvents are used to prepare several different lasing media.

| Solvent | Composition |
|---|---|
| Control | Methanol |
| A | Hexafluoroisopropanol (25%) and water (75%) |
| B | Trifluoroethanol (25%) and water (75%) |
| C | Hexafluoroisopropanediol (25%) and water (75%) |

A variety of dyes as listed in Table 4 below are individually dissolved in the above solvents at the concentrations indicated. In all cases, the solutions are air saturated. For purposes of testing, each dye solution is passed through a 15 cm. long 3/16 in. ID quartz cuvette at a gravity induced flow rate of 10 cm$^3$/sec. About 10 cm. beyond each end of the cuvette is a plane dielectric flat mirror. In each instance, the lasting medium is excited by a "Sorokin-type" air discharge flashlamp, the spectral output of which is smooth (free of line sources) and similar to a black body source. Thus, any changes in thresholds should not be attributed to a simple solvent-induced shift in the position of the absorption maximum caused by some intense emission line of the source. These dyes could not be evaluated in water alone as the compounds are essentially water-insoluble. The energy for the flashlamp is stored by a Cornell Dubillier 1 $\mu$f. fast discharge capacitor. Thresholds recorded are the minimum voltages on the capacitor required to initiate lasing. From the threshold voltage, the threshold energy (E) is determined from the formula $E = \frac{1}{2} CV^2$ where C is the capacitance of the storage capacitor and V is the voltage across the capacitor. The results of threshold measurements are shown in Table 4 below together with the wavelength of lasing.

TABLE 4

| Dye & Concentration | Solvent | Threshold Voltage (KV) | Threshold Energy (joules) | Lasing Wavelength (nm) |
|---|---|---|---|---|
| Rhodamine B 10$^{-4}$m | Control | 10.8 | 58 | 613 |
| | A | 9.25 | 42 | 612 |
| | B | 10.5 | 55 | 615 |
| | C | 11.0 | 60 | 616 |
| Rhodamine 3B 10$^{-4}$m | Control | 10.75 | 54 | 617 |
| | A | 8.7 | 38 | 610 |
| Rhodamine 6G 10$^{-4}$m | Control | 8.5 | 36 | 592 |
| | A | 9.0 | 40 | 574 |
| Dye 1 10$^{-4}$m | Control | 8.5 | 36 | 558 |
| | A | 8.4 | 35 | 559 |
| Dye 2 (a red pyrylium dye) 10$^{-4}$m | Control | 12.6 | 79 | 670 |
| | A | 15.5 | 120 | 670 |
| 7-diethylamino-4-methyl coumarin 10$^{-3}$m | Control | 12.5 | 78 | 464 |
| | A | 11 | 60 | 468 |
| Dye 3 10$^{-3}$m | Control | 9.5 | 45 | 481 |
| | A | 9.0 | 40 | 488 |
| Dye 4 10$^{-4}$m | Control | 11 | 60 | 631 |
| | A | 13.3 | 88 | 616 |

Dye 1: 10-methoxy-12,13-dihydrodibenzo[a,h]xanthylium perchlorate
Dye 2: 2,4-bis(4-ethoxyphenyl)-6-(4-n-amyloxystyryl)-pyrylium fluoroborate
Dye 3: 9-methyl-2,3,6,7-tetrahydro-1H,5H-quinolizino[1,9-gh] coumarin
Dye 4: 9-(2-carboxyphenyl)-2,3,6,7,12,13,16,17-octahydro-1H,5H, 11H,15H-diquinolizino[1,9-bc:1',9'-hi]xanthylium chloride The invention has been described in detail with particular reference to certain preferred embodiments thereof, but it will be understood that variations and modifications can be effected within the spirit and scope of the invention.

I claim:

1. A dye laser having a reservoir means containing a laser dye solution and operably coupled therewith a pumping energy source for exciting and causing an inversion of energy state of laser dye solution to produce stimulated emission thereof, said laser dye solution comprising a lasing concentration of a fluorescing dye in a solvent comprising a fluorinated alcohol.

2. A dye laser as described in claim 1 wherein said solvent contains from about 90 to about 70 percent by volume of water.

3. A dye laser as described in claim 1 wherein said dye is present in a concentration from about 10$^{-7}$ moles per liter to about 10$^{-1}$ moles per liter.

4. A dye laser as described in claim 1 wherein said dye is selected from the group consisting of a xanthene dye, a coumarin dye, a pyrylium dye and a cyanine dye.

5. A dye laser as described in claim 1 wherein said fluorinated alcohol is selected from the group consisting of a fluorinated aliphatic alcohol and a fluorinated aryl alcohol.

6. A dye laser as described in claim 1 wherein said alcohol is selected from the group consisting of trifluoroethanol, trifluorooethanediol, tetrafluoropropanol, hexafluoroisopropanol, hexafluoroisopropanediol, hexafluorobutanol, hexafluoroisobutanol, hexafluoropentanol, trifluorophenol, trifluoromethylphenol, trifluororesorcinol, trifluorophenylcarbinol, and trifluoromethylphenylcarbinol.

7. A dye laser having a reservoir means containing a laser dye solution and operably coupled therewith a pumping energy source for exciting and causing an inversion of energy state of laser dye solution to produce stimulated emission thereof, said laser dye solution comprising a lasing concentration of a fluorescing dye in a solvent system comprising from about 10 to about 30 percent by volume of a fluorinated lower aliphatic alcohol.

8. A dye laser as described in claim 7 wherein the alcohol is selected from the group consisting of trifluoroethanol, tetrafluoropropanol, hexafluoroisopropanol and hexafluoroisopropanediol.

9. In a method of producing coherent dye laser emission by optically pumping a dye solution to cause an inversion of energy states of said solution to produce stimulated emission thereof, said solution containing between about 10$^{-1}$ to about 10$^{-7}$ moles of a fluorescing dye per liter of solvent, the improvement which comprises using a solvent for said fluorescing dye which comprises a fluorinated alcohol.

* * * * *